US010330250B2

(12) United States Patent
Hallgren (10) Patent No.: US 10,330,250 B2
(45) Date of Patent: Jun. 25, 2019

(54) GUIDE RAIL ASSEMBLY AS WELL AS GUIDE RAIL HOLDER

(71) Applicant: XYLEM IP MANAGEMENT S.À.R.L., Senningerberg (LU)

(72) Inventor: Gert Hallgren, Hägersten (SE)

(73) Assignee: XYLEM IP MANAGEMENT S.À R.L., Luxembourg (LU)

( * ) Notice: Subject to any disclaimer, the term of this patent is extended or adjusted under 35 U.S.C. 154(b) by 0 days.

(21) Appl. No.: 15/309,347

(22) PCT Filed: Apr. 28, 2015

(86) PCT No.: PCT/IB2015/053071
§ 371 (c)(1),
(2) Date: Nov. 7, 2016

(87) PCT Pub. No.: WO2015/170222
PCT Pub. Date: Nov. 12, 2015

(65) Prior Publication Data
US 2017/0114949 A1    Apr. 27, 2017

(30) Foreign Application Priority Data
May 7, 2014    (SE) ...................................... 1450540

(51) Int. Cl.
F16M 13/02        (2006.01)
B66B 7/02         (2006.01)
(Continued)

(52) U.S. Cl.
CPC ............. *F16M 13/02* (2013.01); *B66B 7/023* (2013.01); *F16B 7/0413* (2013.01);
(Continued)

(58) Field of Classification Search
CPC ... Y10T 403/557; Y10T 403/55; F16M 13/02; F16M 1/00; F16B 7/0413; F16B 7/06; F16B 7/1445
See application file for complete search history.

(56) References Cited

U.S. PATENT DOCUMENTS 2,214,177 A * 9/1940 Raybould ............... F16B 7/025
174/21 JS
2,290,430 A * 7/1942 Heiser ....................... E06B 9/44
285/397
(Continued)

FOREIGN PATENT DOCUMENTS

DE        530320 C * 7/1931 ............ F16B 7/1409
DE    202 05 329 U1   6/2002
(Continued)

OTHER PUBLICATIONS

PCT International-Type Search Report, dated Nov. 20, 2014, corresponding to Swedish Patent Application No. 1450540-8, filed May 7, 2014.
(Continued)

*Primary Examiner* — Kimberly T Wood
(74) *Attorney, Agent, or Firm* — RatnerPrestia (57) ABSTRACT

A guide rail assembly for a submersible machine as well as a guide rail holder for such a guide rail assembly is described herein. The guide rail holder includes a radially extending support body and an axially extending post, which is rigidly connected to the support body and which is adapted to be inserted into an end of the guide rail. An engagement head is connected to the post at a distance from the support body and has a greater radial extension than the post. The engagement head includes a radially expandable member that is adapted to be reversibly manipulated between an active state, in which the expandable member is in engagement (Continued)

with the guide rail, and an inactive state, in which the expandable member is disengaged from the guide rail.

8 Claims, 9 Drawing Sheets

(51) Int. Cl.
    *F16B 7/04*     (2006.01)
    *F16M 1/00*     (2006.01)
    *F16B 7/14*     (2006.01)
    *F16B 7/06*     (2006.01)

(52) U.S. Cl.
    CPC .............. *F16B 7/1445* (2013.01); *F16M 1/00* (2013.01); *F16B 7/06* (2013.01)

(56) References Cited

U.S. PATENT DOCUMENTS

| | | | |
|---|---|---|---|
| 2,503,997 A | 5/1947 | Miller | |
| 2,542,967 A * | 2/1951 | Waechter | F16B 7/1445 248/188.5 |
| 2,850,304 A * | 9/1958 | Wagner | E04G 7/20 256/65.15 |
| 2,904,379 A * | 9/1959 | Nelson | A47B 13/003 108/148 |
| 2,952,484 A * | 9/1960 | Zoltok | E04H 12/08 403/297 |
| 3,620,558 A * | 11/1971 | MacMillan | F16B 7/0446 403/290 |
| 3,945,743 A * | 3/1976 | Koch | F16B 7/025 403/290 |
| 4,090,798 A * | 5/1978 | Barton | F16B 7/0413 182/178.3 |
| 4,671,872 A | 6/1987 | Cramer et al. | |
| 4,756,639 A * | 7/1988 | Hoshino | F16B 5/0088 403/183 |
| 4,997,304 A * | 3/1991 | Choy | F16B 7/0413 403/171 |
| 5,186,570 A * | 2/1993 | Graf | F16B 7/025 403/174 |
| 5,634,733 A | 6/1997 | Sperduti | |
| 7,128,012 B2 * | 10/2006 | King | B63B 13/00 114/218 |
| 2002/0162936 A1 | 11/2002 | Mellardo et al. | |
| 2007/0031187 A1 * | 2/2007 | McNeal | A47F 5/14 403/297 |
| 2010/0296364 A1 | 11/2010 | Pensler et al. | |
| 2011/0198476 A1 | 8/2011 | Geinitz et al. | |
| 2013/0320666 A1 * | 12/2013 | Ko | F16L 39/005 285/123.3 |

FOREIGN PATENT DOCUMENTS

| | | |
|---|---|---|
| DE | 10 2007 062 563 A1 | 6/2009 |
| EP | 0 053 596 | 6/1982 |
| GB | 2 142 110 A | 1/1985 |

OTHER PUBLICATIONS

PCT International Preliminary Report on Patentability, dated May 6, 2016, corresponding to International Application No. PCT/IB2015/053071, filed Apr. 28, 2015.

* cited by examiner

GUIDE RAIL ASSEMBLY AS WELL AS GUIDE RAIL HOLDER

CROSS-REFERENCE TO RELATED APPLICATIONS

This patent application is a U.S. National Phase Patent Application of PCT Application No. PCT/IB2015/053071, filed Apr. 28, 2015, which claims priority to Swedish Patent Application No. 1450540-8, filed May 7, 2014, both of which are incorporated by reference herein in their entirety.

TECHNICAL FIELD OF THE INVENTION

The present invention relates in general to a guide rail assembly for a submersible machine, such as a mixer unit. According to a first aspect the present invention relates to a guide rail assembly comprising at least two guide rail holders and one guide rail, and according to a second aspect the present invention relates to a guide rail holder for connecting at least one guide rail for a submersible machine to a wall bracket, the guide rail holder comprising a radially extending support body, an axially extending post, which is rigidly connected to said support body and which is adapted to be inserted into an end of said guide rail.

BACKGROUND OF THE INVENTION AND PRIOR ART

Traditionally the guide rail of a guide rail assembly has been supported and connected to a tank wall by means of guide rail holders comprising rigid pipe segments welded thereto, the pipe segments being inserted into the respective guide rail end such that the outer surface of the pipe segment abut the inner surface of the guide rail. U.S. Pat. No. 8,277,115 disclose such a rigid arrangement. However, a rigid connection of this type is impaired with several drawbacks. More specifically, the forces and bending moments that the submersible machine exerts the connection between the guide rail and the guide rail holder for, result in the guide rail ends experiencing great stress and they risk to split open due to the rigid connection. Thereto the mixer unit in operation generates pulsating forces acting on the guide rail and guide rail holders. This lead to the wall that the guide rail assembly is connected to is worn out and shredded.

US 2002/162936 disclose an alternative way of connecting two guide rails. It describes an adapter comprising a central body having squared cross section and from which body two sets of flexible members extend in the axial direction. The two sets are inserted into the end of the respective guide rail, whereby a connection of the guide rails is achieved. The flexible members entail that abutment against the inner surfaces of the guide rails is ensured. When the plant is in operation the guide rails may neither be displaced/bend in relation to each other nor in relation to the adapter, and thus also this connection is rigid and thereby impaired with the above drawbacks.

OBJECTS OF THE INVENTION

The present invention aims at obviating the aforementioned disadvantages and failings of previously known guide rail holders and at providing an improved guide rail holder. A primary object of the present invention is to provide an improved guide rail holder of the initially defined type, which guide rail holder spare the guide rail ends, the wall brackets and the wall by reducing, and at the best fully eliminate, the material fatigue that is the result of the forces and bending moment that the submersible machine exerts the guide rail assembly for.

Another object of the present invention is to provide a guide rail holder that entail that the guide rail ends does not split open.

It is another object of the present invention to provide a guide rail holder that dampen vibrations generated during operation in the entire guide rail assembly and especially in the guide rail holder.

It is also an object of the present invention to provide great tolerances in the axial direction upon mounting of the guide rail assembly, by having the guide rails displaceable in the axial direction in relation to the guide rail holders.

BRIEF DESCRIPTION OF THE INVENTION

According to the invention at least the primary object is attained by means of the initially defined guide rail assembly and guide rail holder having the features defined in the independent claims. Preferred embodiments of the present invention are further defined in the dependent claims.

According to a first aspect of the present invention, there is provided a guide rail assembly of the initially defined type, and according to a second aspect of the present invention there is provided a guide rail holder, wherein the guide rail holder is characterized in that it also comprises an engagement head that is connected to said post at a distance from said support body and has a greater radial extension than said post, the engagement head comprising a radially expandable member that is adapted to be reversibly manipulated between an active state, in which the expandable member is in engagement with the guide rail, and an inactive state, in which the expandable member is disengaged from the guide rail.

Thus, the present invention is based on the insight that a radially expandable member, when in its expanded active state is brought into engagement with the guide rail, allow bending of the guide rail in relation to the guide rail holder having unchanged structural support for the guide rail. More specifically, via the member a flexible, i.e. non rigid connection between the guide rail holder and the guide rail is achieved. The entire guide rail assembly hereby achieves an increased structural flexibility and may in a better way absorb the bending moment acting on the guide rail. Thereto, the insight that by placing the engagement head at a distance from the guide rail end, and not as customary, in the immediate vicinity of the guide rail end, the result will be that the guide rail ends will not split open. Thereto, the material properties of the expandable member also makes it possible, when it is forced in engagement with the guide rail, to dampen the vibrations that during operation are generated in the guide rail assembly and especially in the guide rail holder.

According to a preferred embodiment of the present invention the engagement head comprises a first plate and a second plate, said expandable member being arranged between said first plate and said second plate, the guide rail holder comprising means for adjusting the distance between the first plate and the second plate, that among other things entail the possibility to adjust the degree of radial extension of the member. Hereby the state of the member can be reversibly manipulated, i.e. change between an active state and an inactive state.

According to another preferred embodiment the means for adjusting the distance between the first plate and the second plate is constituted by at least one screw joint. Hereby a simple and robust as well as precise way of adjusting the distance between the plates is accomplished.

According to a preferred embodiment of the guide rail assembly it comprises a wall bracket per guide rail holder, the guide rail holder being turnably connected to the wall bracket about an axially extending pivot. Hereby the guide rail, including the mounted mixer unit, may turn about the pivot. Consequently the operator may choose which part of the liquid that shall be mixed. This give enhanced possibilities to optimize the mixing process.

In yet another preferred embodiment of the guide rail assembly it also comprises an indexing means, which is connected to a guide rail holder and which is adapted to turn the guide rail holder about the pivot axis and is adapted to place the guide rail holder in predetermined positions in relation to the wall bracket. By means of the indexing means determining the turning step a robust control of the positioning of the guide rail holder in relation to the wall bracket is achieved.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS

Figures 1, 2:
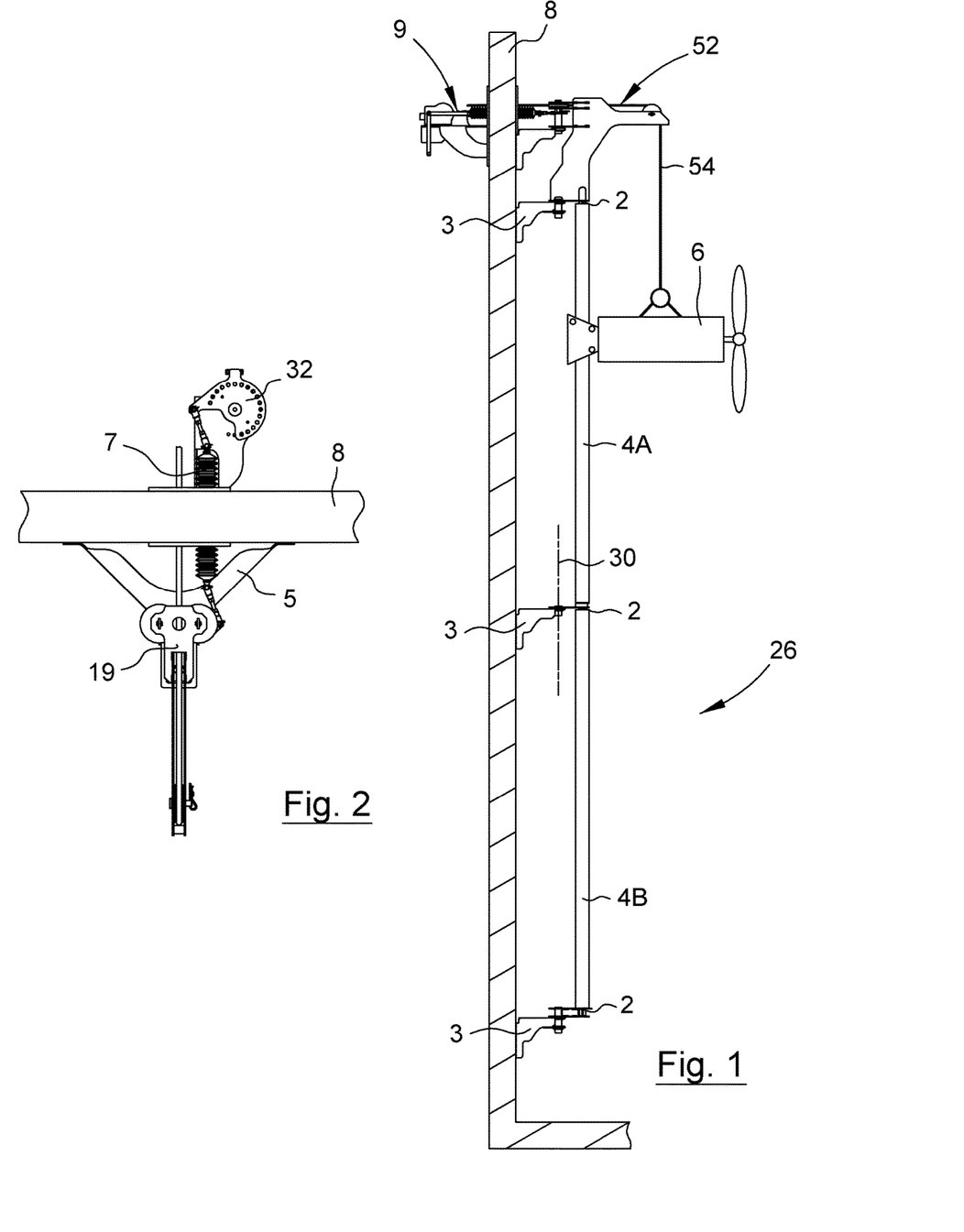
FIG. 1 is a schematic side view of an installation of a guide rail assembly during lowering of the corresponding mixer unit.
FIG. 2 is a schematic view from above of the installation of the guide rail assembly according to FIG. 1.

The present invention relates in general to a guide rail assembly for a submersible machine, such as a mixer unit. Reference is initially made to FIGS. 1 and 2, which are a schematic side view and a schematic view from above, respectively, of an installation of a guide rail assembly together with mixer unit during lowering.

The guide rail assembly 26 disclosed comprises three guide rail holders 2 that are attached to a supporting tank wall 8 by means of respective wall brackets 3. The disclosed guide rail assembly comprises two guide rails 4A, 4B or two guide rail segments, which are supported by and hold by the guide rail holders 2. More specifically, as is apparent from FIG. 1 the guide rail assembly 26 comprises an upper guide rail 4A that in an upper end is hold by an upper guide rail holder 2A as well as in a lower end is supported and hold by a intermediate guide rail holder 2B. The guide rail assembly 26 further comprises a lower guide rail 4B that in a lower end is supported and hold by a lower guide rail holder 2C as well as in an upper end is hold by the above mentioned intermediate guide rail holder 2B. The respective guide rail holder 2A-2C and thereto belonging parts will be described in more detail in connection with FIGS. 3-15. The guide rail 4 extends in parallel with the wall 8, preferably in a vertical direction. The axial length of a guide rail may be in the size of 3-6 meters.

A submersible mixer unit 6 is arranged in such a way that it can be displaced along the guide rail 4 in a conventional way. The axial displacement of the mixer unit 6 is controlled by a control unit, disclosed in FIG. 1, that is located at an outside of the tank wall 8. In this embodiment the displacement of the mixer unit 6 is made by means of a conventional winch device 52 comprising a wire 54, in a conventional way. The displacement can be accomplished either manually or by means of a motor, for instance an electric motor. The disclosed guide rail assembly 26 comprises a wall bracket 3 per guide rail holder 2, the separate guide rail holder being turnably connected to the respective wall bracket about an axially extending axis 30. By other words, the extension of the axis 30 is parallel with extension of the guide rail 4. The guide rail assembly achieved it this way is thus of turnable type. This entail that the guide rail 4, including the attached mixer unit 6, bay be turned about said axis 30. In an alternative, not disclosed, embodiment the guide rail assembly is of stationary type, i.e. the guide rail is rigidly attached to the tank wall. As is apparent from FIG. 2 the guide rail assembly 26 comprises an indexing means 32. The indexing means 32, that in this embodiment is a rotatable disc having peripheral recesses, is adapted to partly turn the guide rail holder 2 about above mentioned axis 30 partly position the guide rail holder 2 in determined positions in relation to the wall bracket 3. The rotatable disc 32 is via a link 7 extending through an opening in the tank wall 8, connected to a unit 19 that transfer the turning motion of the disc to a turning of the guide rail 4. This unit is connected to the tank wall 8 by means of a coupling member 5 comprising two arms. By turning the disc 32 a turning motion of the guide rail is achieved, including the attached mixer unit (not disclosed in FIG. 2).

Figure 3:
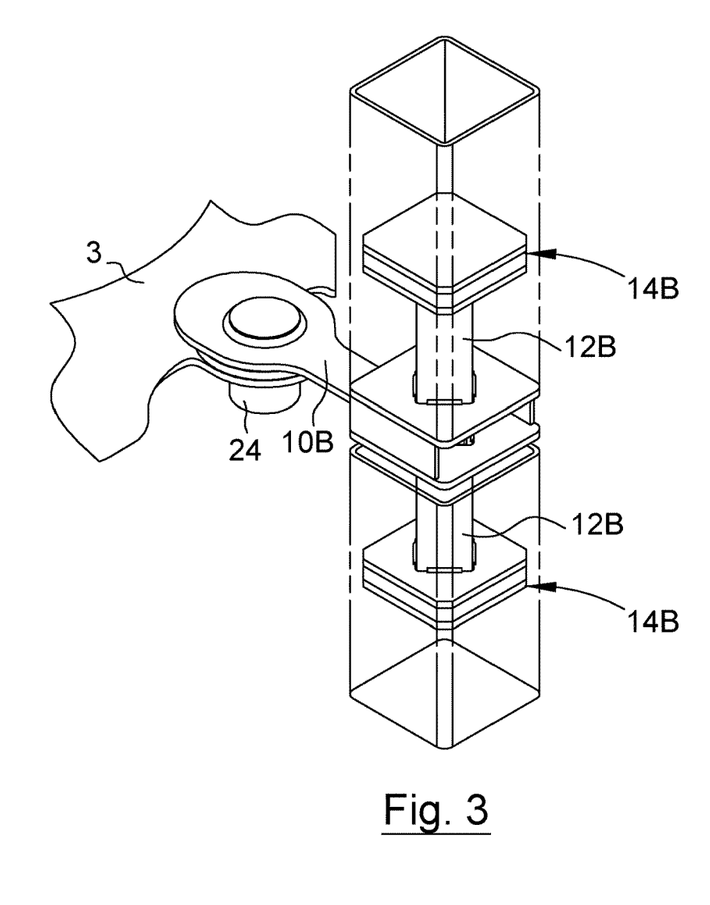
FIG. 3 is a schematic perspective view from above of a guide rail holder in the form of a joint between two guide rails, the guide rails are presented as transparent.
Figure 4:
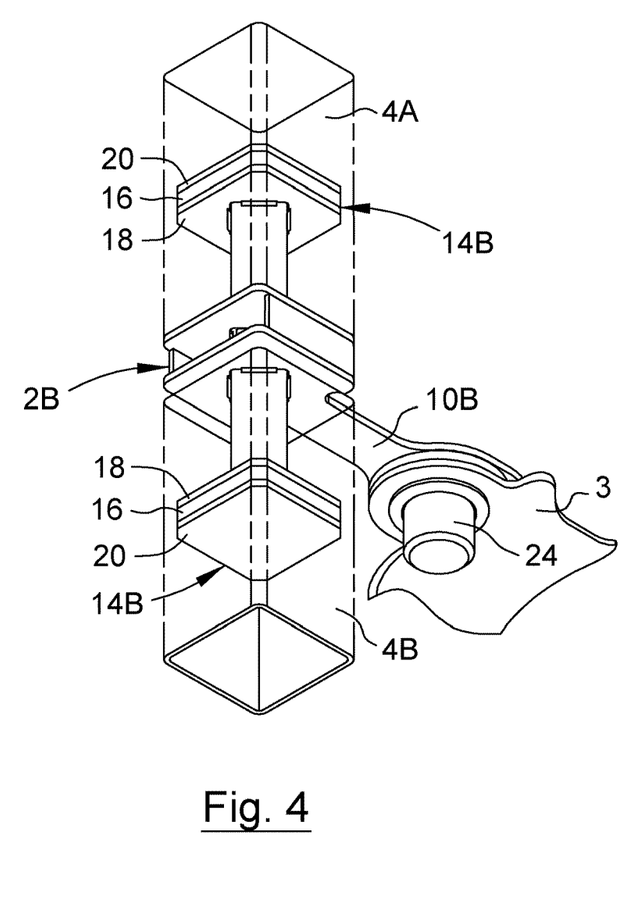
FIG. 4 is a schematic perspective view from below of the guide rail holder according to FIG. 3, the guide rails are presented as transparent.

Reference is now made to FIGS. 3 and 4, which are schematic perspective views from above and from below, respectively, of an intermediate guide rail holder 2B, comprising two engagement heads 14B, which guide rail holder constitute a joint between two guide rails 4A, 4B, the guide rails are presented as transparent.

As has been mentioned above the inventive guide rail holder 2 is suitable for connecting a guide rail to a wall bracket 3. The guide rail holder 2B disclosed in FIGS. 3-4 comprises a radially extending support body 10*b* and two from said support body axially extending posts 12B. The posts 12B are rigidly connected to the support body 10B. Thereto each post 12B is adapted to be inserted into the two opposite end of the two guide rails 4A, 4B. The guide rail, and the posts, has in this embodiment a squared cross section, seen in a radial plane, but it shall be realized that also other cross sections are conceivable. The guide rail holder 2B comprises also two engagement heads 14B that are connected to one post 12B each and that are arranged at a distance from the support body 10B. The engagement heads 14B have in the disclosed embodiment squared cross section as the guide rails. The engagement heads 14B have a greater radial extension than the posts 12B and each engagement head comprises a radially expandable member 16 that is arranged to be reversibly manipulated between an active state, in which the expandable member 16 is in engagement with the guide rail, and an inactive state, in which the expandable member 16 is disengaged from the guide rail 4.

By arranging the engagement heads 14B according to the above, i.e. short abutment in the axial direction between the guide rail holder and the guide rail by means of the expandable member 16 of the engagement heads 14B at a distance from the support body, bending of the guide rail in relation to the fixed guide rail holder is allowed with retained firm support. The guide rail 4 is supported by the expandable member 16 that in the active state is in engagement with the guide rail 4 also during the event the guide rail, due to external effect, is in bent condition in relation to the guide rail holder 2B. Thereby a flexible, i.e. non rigid, connection between the guide rail holder 2*b* and the upper guide rail 4A and the lower guide rail ¤ B, respectively, is attained. The guide rail holder 2B also comprises an axially extending pivot 24 that is rigidly connected to the support body 10B. The pivot 24 extend in parallel with the posts 12B and is offset in the radial direction in relation to said posts. The pivot 24 is journalled in the wall bracket 3 that is provided with a round through hole. The wall bracket 3 is in a conventional way, for instance by means of suitable bolts, attached to the supporting tank wall 8. The journalled pivot 24 can be freely turned within a predetermined interval.

The respective engagement head 14B is, as disclosed above, arranged at a distance from the support body 10B. More specifically, the distance between the engagement head and the support body may be greater than 50 percentage of the smallest crosswise distance of the engagement head, preferably greater than 100 percentage of said crosswise distance. Such a location of the engagement head 14 in relation to the support body 10B contribute to eliminate split open of the guide rail ends. The different components and function of the engagement heads will now be described in more detail in connection with FIGS. 5-7.

Figure 5:
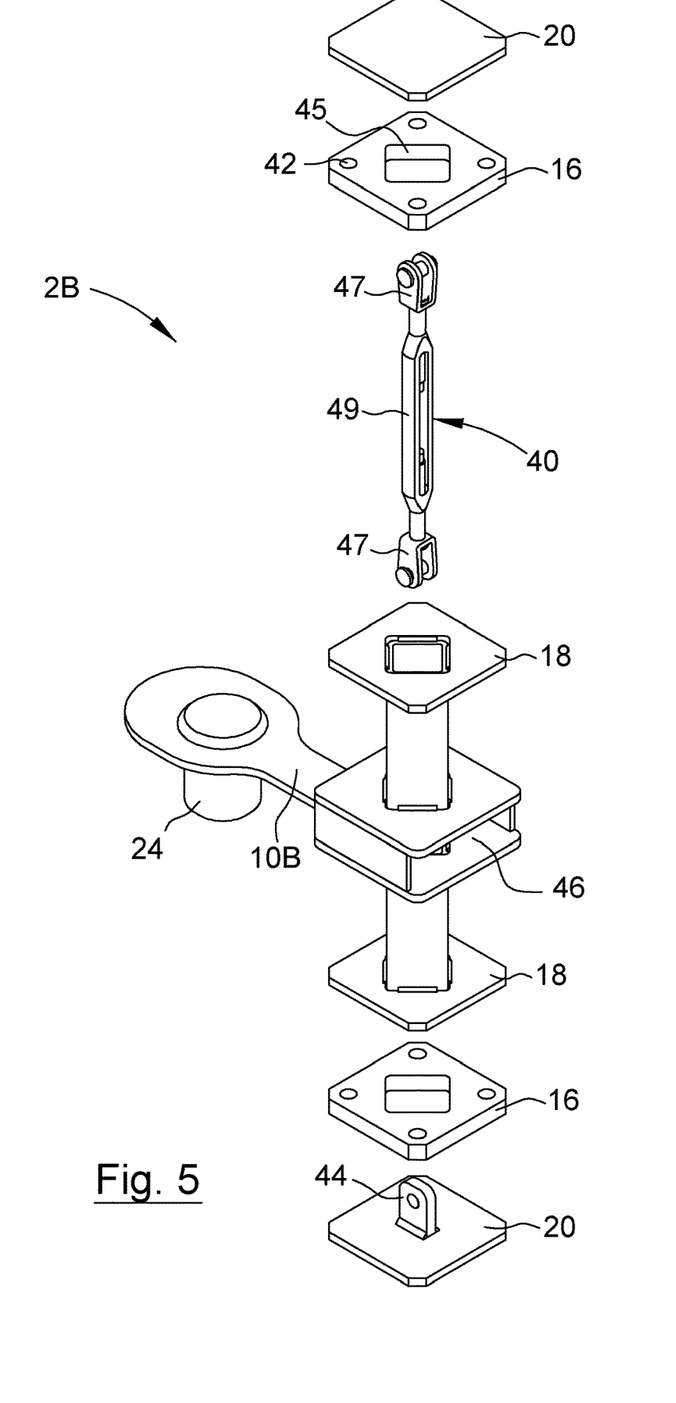
FIG. 5 is a schematic exploded perspective view from above of the guide rail holder according to FIGS. 3 and 4.

In the following is referred to FIG. 5 that is a schematic perspective exploded view from above of the intermediate guide rail holder having two engagement heads, according to FIGS. 3 and 4, as well as FIGS. 6 and 7, which are schematic cross sectional views from the front and the side, respectively, of the guide rail holder and guide rails according to FIG. 3. The guide rail holder 2B comprises two axially extending hollow posts 12B, which are rigidly connected to the support body 10B and which are diametrically protruding from the support body. The guide rail holder 2B also comprises two engagement heads 14B. The respective engagement head 14*b* of the guide rail holder comprise a first plate 18, located closest to the support body, and a second plate 20, said expandable member 16 being arranged between said first plate 18 and said second plate 20. The expandable member 16 may be constituted by one or more plates arranged onto each other. The post 12B is rigidly connected, for instance welded, to the first plate 18, and the first plate 18 is rigidly connected to the post 12B. In this embodiment the respective second plate 20 is provided with an axially protruding member 44 having an eye, protruding in the direction against the support body. The expandable member 16, typically made of rubber having suitable deformation characteristics, is provided with one larger, centrally located opening 45 as well as four smaller, peripherally located openings 42. The object of the larger opening is to allow passage of said axially extending member 44 having an eye. The smaller openings 42 will be described in more detail in connection with FIGS. 8-11. The rubber material will dampen harmful vibrations that are generated during operation in the guide rail assembly and especially in the guide rail holder.

The guide rail holder thereto comprises means 40 for adjusting the distance between the first plate and the second plate. In this embodiment the means for adjusting the distance between the plates 18, 20 is constituted by at least one screw joint. The screw joint 40 can be realized in different ways, for instance by means of a turnbuckle, as the one disclosed in FIG. 5. A turnbuckle 40 as a joint element is especially suitable in applications having two opposite engagement heads. The turnbuckle comprises two eyes 47, one in each end, that are connected to each other by means of a so called buckle 49. The eyes are located at two elongated threaded rods 43 that are in engagement with the respective second plate, as is seen in FIGS. 7 and 8, in the shown embodiment with the respective axially extending member 44 having an eye belonging to the second plate, when the guide rail holder is in use. By turning the buckle 49 in a first direction the eye rods are screwed inwards. Thereby the entire length of the turnbuckle is decreased, whereby the second plate 20 is moved towards the first stationary plate 18. This entail that the expandable member 16 is compressed and thereby expands in order to be brought in engagement with the inner side of the wall of the guide rail. In other words, one gets a possibility to adjust the degree of radial extension of the member. When the expandable member 16 is in engagement with the inner side of the wall of the guide rail, said radially expandable member is in an active state. By turning the buckle 49 in a second direction the eye rods are screwed outwards. Thereby the entire length of the turnbuckle is increased, whereby the second plate 20 is moved away from the first plate 18. After a certain axial displacement of the respective second plate in the direction away from the respective first plate the engagement between the expandable member 16 and the inside of the wall of the guide rail cease. Then the expandable member 16 is in an inactive state. To sum up, by controlling the turnbuckle 49 one may reversibly manipulate the state of the members, i.e. change between an active and an inactive state. The turnbuckle may either be controlled manually or by means of any suitable tool. As is shown in at least FIGS. 6 and 7, due to the present design in connection with the interface between the two guide rails 4A, 4B, especially the shape of the support body 10B, an opening 46 that admit access to control the turnbuckle according to the above. According to an alternative embodiment the two engagement heads 14*b* are manipulated independently from each other by means of individual adjustment means.

Figure 6:
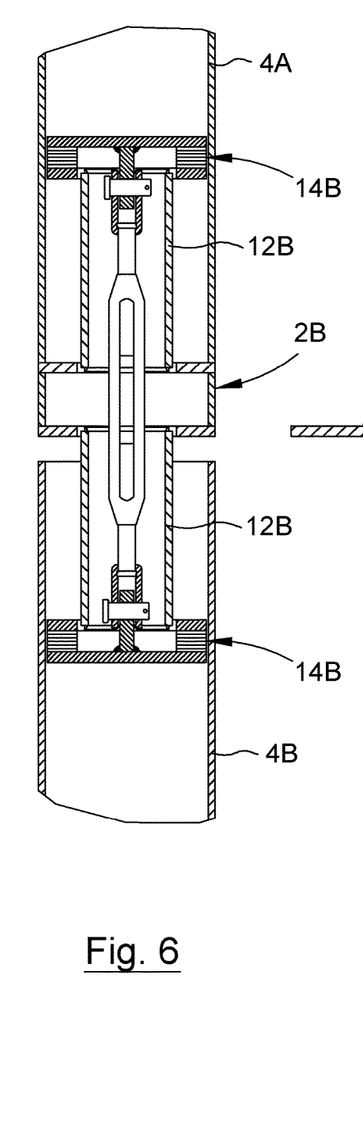
FIG. 6 is a schematic cross sectional front view of the guide rail holder and the guide rail according to FIG. 3.
Figure 7:
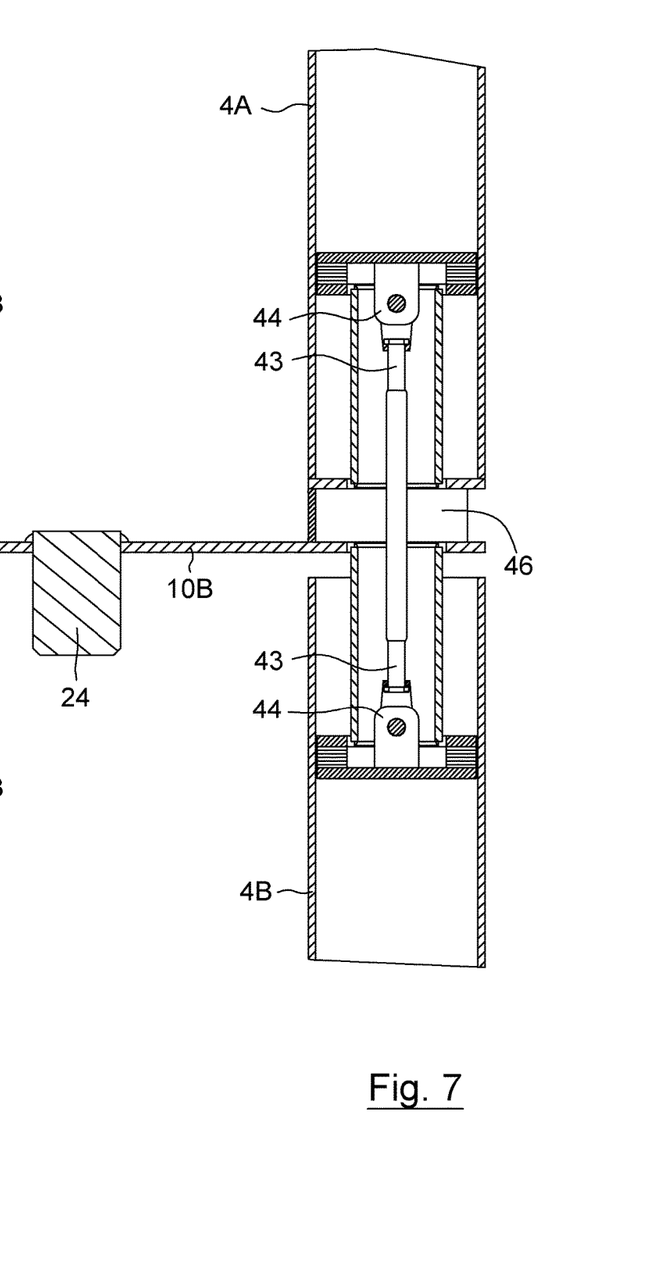
FIG. 7 is a schematic cross sectional side view of the guide rail holder and the guide rail according to FIG. 3.
Figure 8:
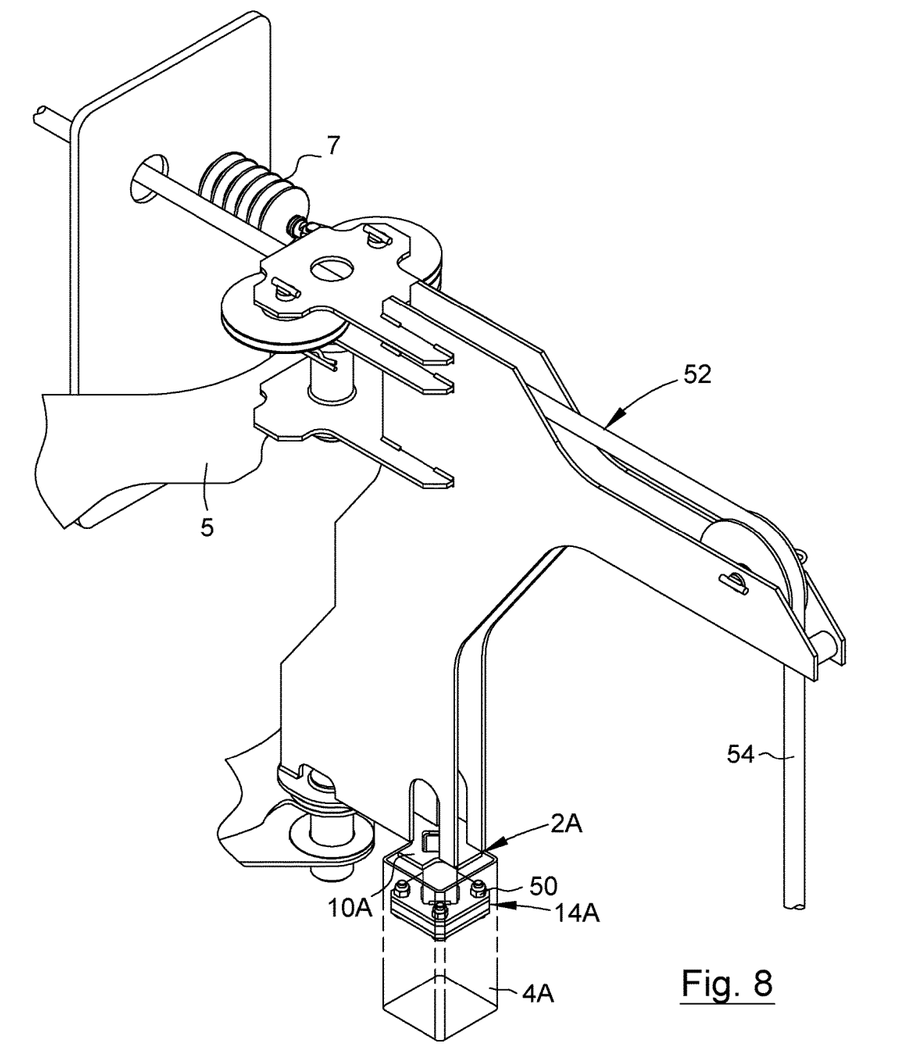
FIG. 8 is a schematic perspective view from above of an upper guide rail holder, the guide rail is presented as transparent.
Figure 9:
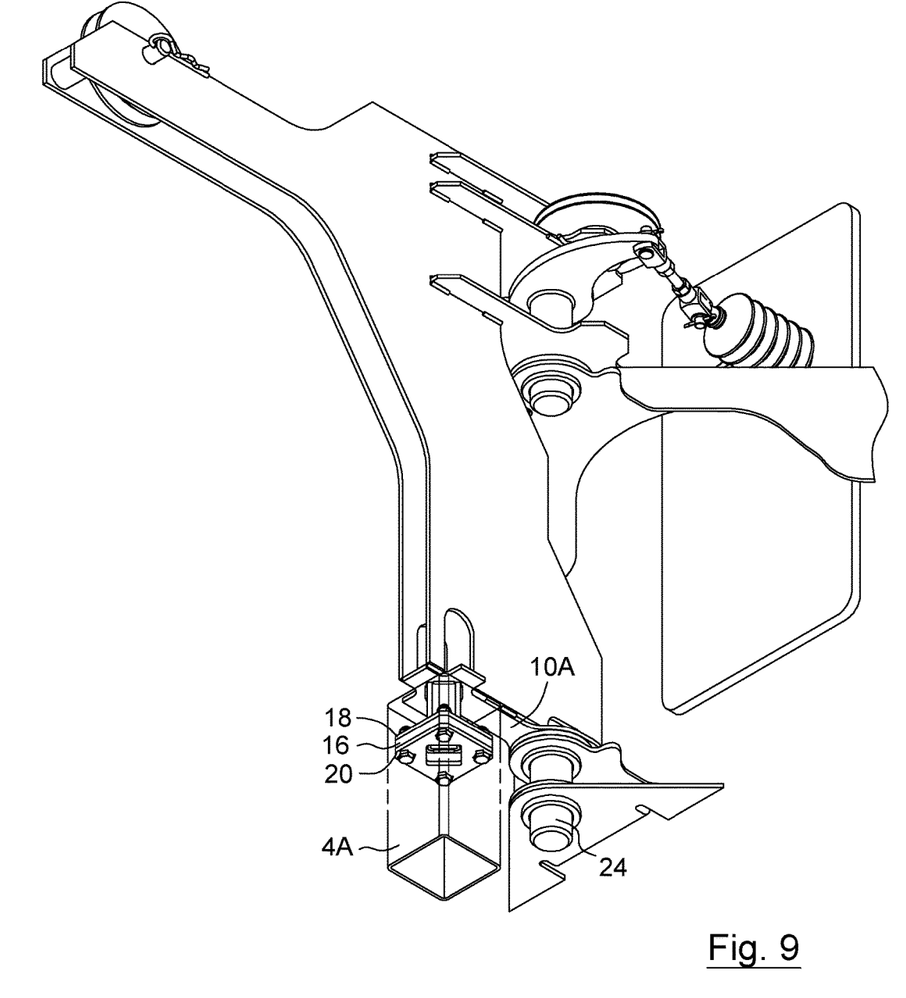
FIG. 9 is a schematic perspective view from below of the upper guide rail holder according to FIG. 8.

As is apparent from FIGS. 6 and 7 there is an axial tolerance concerning the location of the upper end of the lower guide rail 4B in relation to the guide rail holder 2B, thereto the lower end of the upper guide rail 4A rest against the support body 10B.

Reference is in the following made to FIGS. 8-11. Some of the parts/functions that are similar to the embodiment according to FIGS. 3-7 are not referred to.

The upper guide rail holder 2A disclosed in FIGS. 8-11 comprises a radially extending support body 10A and an axially extending post 12A. The body and the post are rigidly connected to each other. Thereto the post 12A is adapted to be inserted into an upper end of the upper guide rail 4A. The guide rail holder 2A also comprises an axially extending pivot 25 that is rigidly connected to the support body 10A. The pivot 25 extends in parallel with the post 12A and is offset in the radial direction in relation to said post.

FIG. 8 is a schematically perspective view from above of the upper guide rail holder 2*a*, where the guide rail 4A is disclosed as transparent. Parts of the winch device 52 comprising a wire 54 are also disclosed. The engagement head 14A shown in FIG. 8 is made much alike the one discussed above. More specifically, the engagement head 14*a* also in this case comprises a first plate 18, located closest to the support body 10A, and a second plate 20, said expandable member 16 being arranged between said first plate and said second plate. The first plate 18 is rigidly connected to the post 12A that is rigidly connected to the support body 10A. The plates 18, 20 and the expandable member 16 are kept together by means of bolts 58 having corresponding nuts. The number of bolts in this embodiment is four, without being limited thereto. Said bolts extend through four smaller, peripherally arranged openings in the respective plate and in the intermediate expandable member. These openings have also been mentioned in connection with FIGS. 3 and 4. Compression of the plates 18, 20 resulting in a radial extension of the expandable member 16 is attained by tightening the nuts 50 that are visible in FIG. 8. In the other respects this engagement head operate in the same way as the engagement heads described in connection with FIGS. 5-7. The nuts are preferably manipulated by means of a suitable tool.

Figure 10:
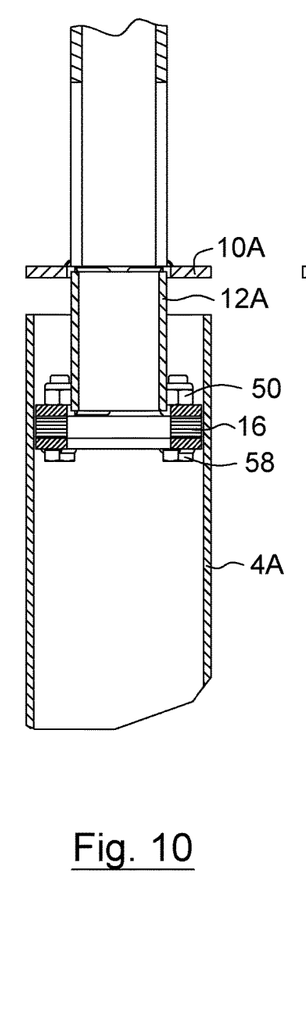
FIG. 10 is a schematic cross sectional front view of the upper guide rail holder and the guide rail according to FIG. 8.
Figure 11:
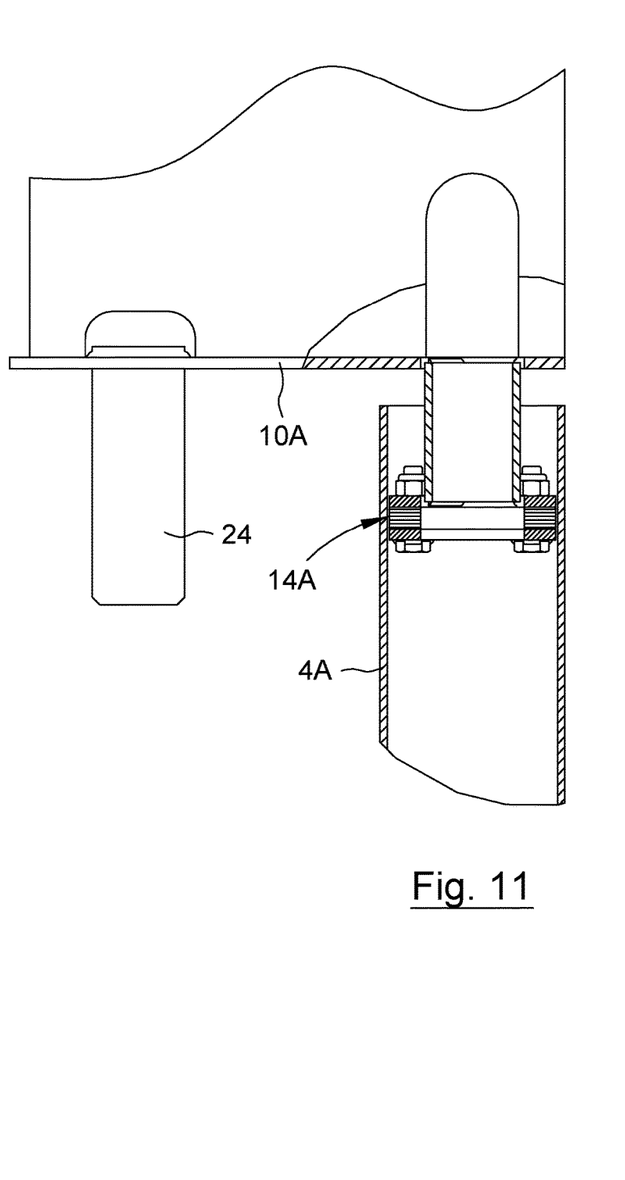
FIG. 11 is a schematic cross sectional side view of a part of the upper guide rail holder and the guide rail according to FIG. 8.

FIG. 10 is a schematic cross sectional front view of the upper guide rail holder and the guide rail according to FIG. 8. FIG. 11 is a schematic cross sectional side view of a part of the upper guide rail holder and the guide rail according to FIG. 8. Both figures contextualize the location of the guide rail holder in relation to the actual guide rail in this embodiment. As is apparent from FIGS. 10 and 11 there is an axial tolerance with regards to the location of the guide rail end in relation to the guide rail holder.

Reference is now made to FIGS. 12-15. Parts/functions that are similar to the embodiments according to FIGS. 1-11, and especially according to the embodiment according to FIGS. 8-11, are not referred to. In this context as is shown in at least FIGS. 12 and 13, which are a schematic perspective view from below and from the front, respectively, of the lower guide rail holder 2C, the engagement head 14C is structurally and functionally similar to the engagement head 14A discussed in connection with FIGS. 8-11.

Figure 12:
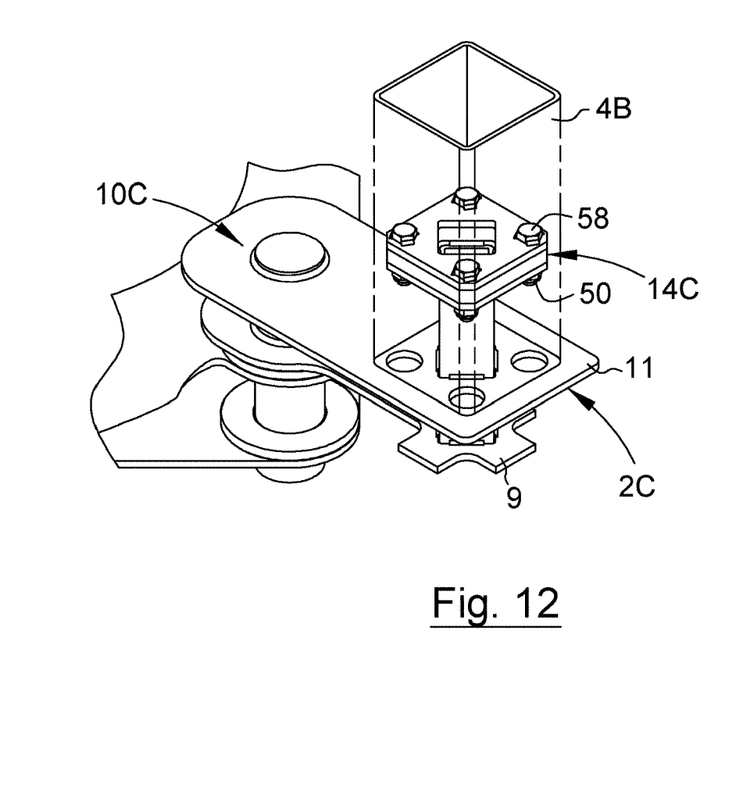
FIG. 12 is a schematic perspective view from above of a lower guide rail holder, the guide rail is presented as transparent.
Figure 13:
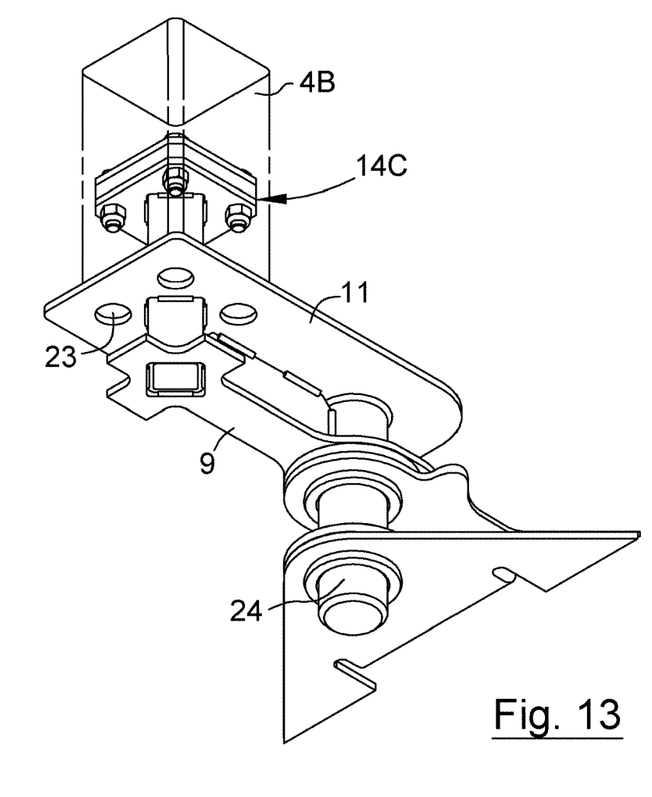
FIG. 13 is a schematic perspective view from below of the lower guide rail holder according to FIG. 12, the guide rail is presented as transparent.
Figure 14:
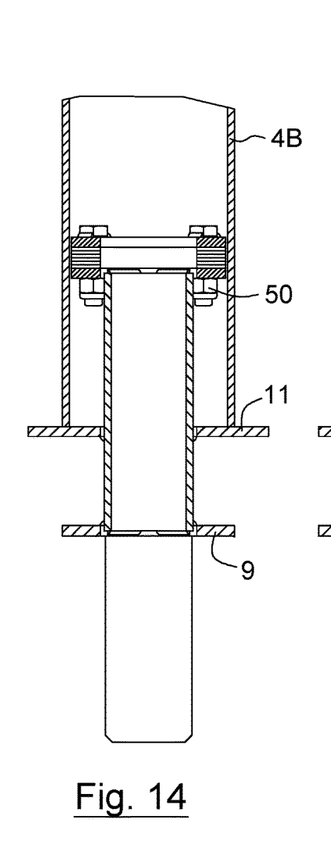
FIG. 14 is a schematic cross sectional front view of the lower guide rail holder and the guide rail according to FIG. 12.
Figure 15:
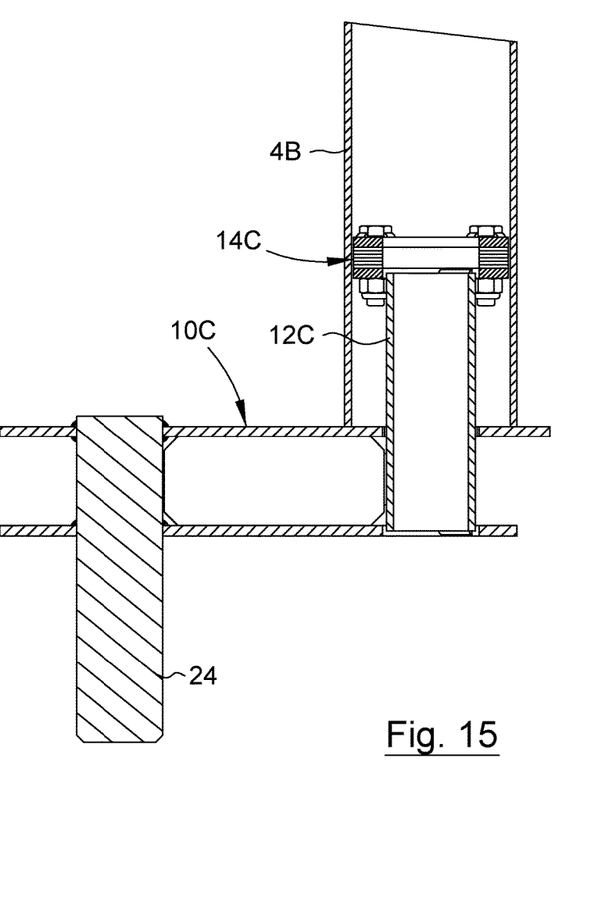
FIG. 15 is a schematic cross sectional side view of the lower guide rail holder and the guide rail according to FIG. 12.

FIG. 14 is a schematic cross sectional front view of the lower guide rail holder 2C and the lower guide rail 4B according to FIG. 12, and FIG. 15 is a schematic cross sectional side view of the lower guide rail holder 2C and the lower guide rail 4B according to FIG. 12. Both figures contextualize the location of the guide rail holder in relation to the actual guide rail in this embodiment. Thereto, as is especially apparent from FIGS. 14 and 15 the support body 10C of the lower guide rail holder comprises two radially extending, parallel parts 9, 11. The post 12C of the lower guide rail holder is connected to lower part 9 of the support body 10C and to the upper part 11 of the support body 10C in order to obtain enough rigidity in the guide rail holder. The lower end of the lower guide rail 4B abut against the upper part 11 of the support body 10C. Thereto, the upper part 11 of the support body 10C is provided with a recess 53 that admit access for the manipulation tool that may tighten/loosen the nuts 50.

Alternatively in all disclosed guide rail holders the second plate may be rigidly connected to the post, whereupon the first plate is axially displaceable in relation to the second plate in order to activate/inactivate the expandable member.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A guide rail holder for connecting at least one guide rail for a submersible machine to a wall bracket, comprising:
   a radially extending support body,
   an axially extending post, which is rigidly connected to said radially extending support body and which is adapted to be inserted into an end of said guide rail,
   wherein said guide rail holder further comprises an engagement head that is connected to said axially extending post at a distance from said radially extending support body and has a greater radial extension than said axially extending post,
   the engagement head comprising a radially expandable member that is adapted to be reversibly manipulated between an active state, in which the radially expandable member is in engagement with the guide rail, and an inactive state, in which the radially expandable member is disengaged from the guide rail while the axially extending post and the radially expandable member are positioned within the guide rail.

2. The guide rail holder according to claim 1, wherein the distance between the engagement head and the radially extending support body is greater than 50 percent of a smallest crosswise distance of the engagement head.

3. The guide rail holder according to claim 1, wherein the guide rail holder comprises an axially extending pivot, which is rigidly connected to the radially extending support body and which is offset in a radial direction in relation to said axially extending post.

4. The guide rail holder according to claim 1, wherein the guide rail holder comprises two axially extending posts, which are rigidly connected to the support body and which are diametrically projecting from the support body, the guide rail holder comprising two engagement heads.

5. The guide rail holder according to claim 1, wherein a distance between the engagement head and the radially extending support body is greater than 100 percent of a smallest crosswise distance of the engagement head.

6. A guide rail holder for connecting at least one guide rail for a submersible machine to a wall bracket, comprising:
 a radially extending support body,
 an axially extending post, which is rigidly connected to said radially extending support body and which is adapted to be inserted into an end of said guide rail,
 wherein said guide rail holder further comprises an engagement head that is connected to said axially extending post at a distance from said radially extending support body and has a greater radial extension than said axially extending post,
 the engagement head comprising a radially expandable member that is adapted to be reversibly manipulated between an active state, in which the radially expandable member is in engagement with the guide rail, and an inactive state, in which the radially expandable member is disengaged from the guide rail,
 wherein the engagement head comprises a first plate and a second plate, said expandable member being arranged between said first plate and said second plate, the guide rail holder comprising means for adjusting a distance between the first plate and the second plate.

7. The guide rail holder according to claim 6, wherein the means for adjusting the distance between the first plate and the second plate is constituted by at least one screw joint.

8. The guide rail holder according to claim 6, wherein the first plate of the engagement head is located nearest to the radially extending support body, the axially extending post being rigidly connected to said first plate.

* * * * *